United States Patent
Draine et al.

(10) Patent No.: US 7,685,570 B2
(45) Date of Patent: Mar. 23, 2010

(54) ERROR/EXCEPTION HELPER

(75) Inventors: Sean Conway Draine, Seattle, WA (US); David K. Templin, Issaquah, WA (US); Eric Gordon Knox, Redmond, WA (US); Lifeng Lu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 826 days.

(21) Appl. No.: 10/457,267

(22) Filed: Jun. 9, 2003

(65) Prior Publication Data

US 2004/0250175 A1    Dec. 9, 2004

(51) Int. Cl.
G06F 9/44       (2006.01)
G06F 3/048     (2006.01)

(52) U.S. Cl. .................. 717/125; 717/105; 717/113; 715/715

(58) Field of Classification Search .................. None
See application file for complete search history.

(56) References Cited

U.S. PATENT DOCUMENTS

| | | | | |
|---|---|---|---|---|
| 5,740,441 | A * | 4/1998 | Yellin et al. | 717/134 |
| 5,999,731 | A * | 12/1999 | Yellin et al. | 717/126 |
| 6,353,923 | B1 * | 3/2002 | Bogle et al. | 717/128 |
| 6,363,503 | B1 * | 3/2002 | Clauss et al. | 714/57 |
| 6,477,702 | B1 * | 11/2002 | Yellin et al. | 717/126 |
| 6,480,818 | B1 * | 11/2002 | Alverson et al. | 703/26 |
| 6,829,760 | B1 * | 12/2004 | Bera | 717/142 |
| 6,928,640 | B2 * | 8/2005 | Schlussman | 717/137 |
| 6,968,539 | B1 * | 11/2005 | Huang et al. | 717/115 |
| 2003/0135844 | A1 * | 7/2003 | Yellin et al. | 717/126 |
| 2004/0025148 | A1 * | 2/2004 | Krueger | 717/140 |
| 2004/0194063 | A1 * | 9/2004 | Pereira | 717/124 |
| 2005/0229154 | A1 * | 10/2005 | Hiew et al. | 717/110 |

OTHER PUBLICATIONS

"ZStep 95: A Reversible, Animated Source Code Stepper", 1997, Lieberman et al. Online retrieved at <web.media.mit.edu/~lieber/Lieberary/ZStep/ZStep.html >.*

"Using libcurl in Visual Studio", R. Salmanzadeh, Apr. 2002, pp. 1-15. Online retrieved at <http://curl.haxx.se/libcurl/c/visual_studio.pdf>.*

"BACI debugger: a GUI debugger for the BACI system", Strite et al., Mar. 2002, pp. 112-122. Online retrieved at <http://delivery.acm.org/10.1145/780000/774310/p112-strite.pdf>.*

(Continued)

*Primary Examiner*—Tuan Q Dam
*Assistant Examiner*—Thuy Dao
(74) *Attorney, Agent, or Firm*—Woodcock Washburn LLP

(57) ABSTRACT

An error/exception helper may provide tailored help when an error such as an exception is generated. A source program editor interface may be displayed and/or focus given to the program editor interface. An error/exception bubble or tool tip may be displayed, which, in one embodiment of the invention, points to the line of code that generated the exception. The error/exception bubble may include a link to a help topic or the actual help text may be displayed within the bubble. The bubble may also include one or more actions that may be taken to correct the error or a link to a procedure to perform the action(s). The source code may be edited, actions initiated and execution re-initiated at which time the bubble and editor interface display may be dismissed.

21 Claims, 7 Drawing Sheets

OTHER PUBLICATIONS

"Eclipse help system: an open source user assistance offering", Halsted et al., Oct. 2002, pp. 49-59. Online retrieved at <http://delivery.acm.org/10.1145/590000/584964/p49-halsted.pdf>.*

"An interactive environment for real-time software development", Persson et al., Jun. 2000, pp. 57-68. Online retrieved at <http://ieeexplore.ieee.org/stamp/arnumber=848751&isnumber=18405>.*

IBM Research, Eclipse, http://www.research.ibm.com/eclipse, 2 pages.

Borland Jbuilder,http://c2.com/cgi/wiki?BorlanJbuilder, Home Page, 1 page.

Leonard, L. "Automate Error Checking with Debugging Macros", *Windows Developer Magazine*, 2003, 14(2), 8,10, 12-15.

Pietrek, M. *MSDN Magazine*, 2003,18(6) (JUN), 50-62, Discover Improved System Info, New Kernel, Debugging, Security, and UI APIs.

"Let Your Computer Debug its Own Programs", *Interface Age*, 1982, 7(8), 38, 40, 43.

IBM Research, Eclipse, http://www.research.ibm.com/eclipse, 2 pages, Sep. 2003.

Borland Jbuilder,http://c2.com/cgi/wild?BorlanJbuilder, Home Page, 1 page, Sep. 2003.

* cited by examiner

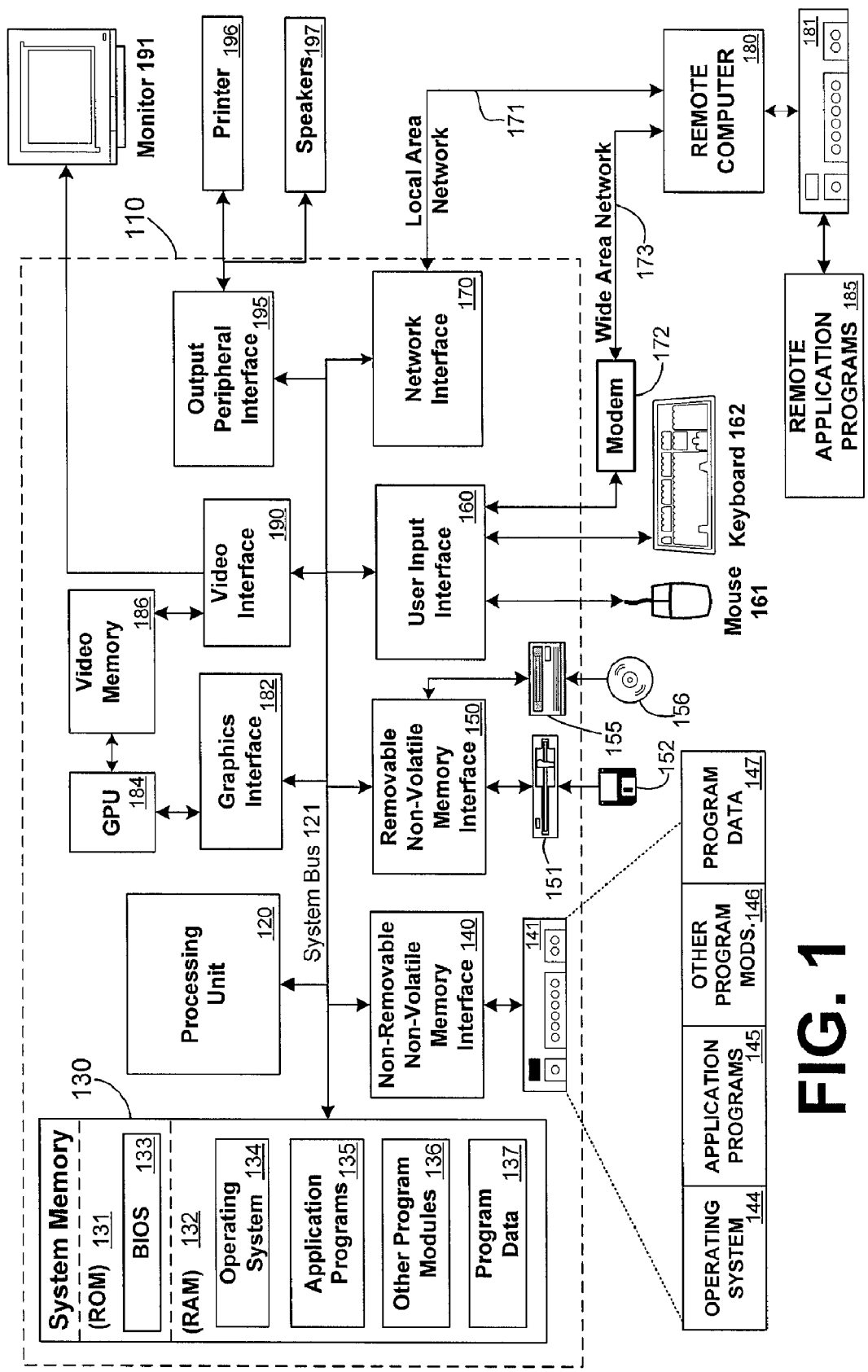

WindowsApplication25 - Microsoft Visual Basic .NET [break] - Form1.vb

File  Edit  View  Project  Build  Debug  Versions  Tools  Window  Help

Form1.vb[Design]  Form1.vb (Form1 Events)　　　　　　　　　　　　　　　　　　　　　　　Load

Public Class Form1
  Inherits System.Windows.Forms.Form

Windows Form Designer generated code  ← 240

Private Sub Form1_Load(ByVal sender As System.Object, ByVal e As System.EventArgs) Handles MyBase
    Dim x As DataSet.                    ← 242
    x.ReadXml ("c:\myxml.xml")
  End Sub
End Class ⌐ 260
                              ☒
          250d ──→
SecurityException                    250
The application requested FileIOPermission and was denied.
                    ← 250b
Troubleshooting Tips:
• Use the OpenFile method instead of FileName.
• Create policy to grant permissions for your program.
• Prompt the user for full trust.
• Handle the exception and degrade gracefully.
Actions
• Add FileIOPermission to the application's permission set.

250c ↗      ← 250a

PROGRAM EDITOR 204

FIG. 2

ERROR/EXCEPTION HELPER

FIELD OF THE INVENTION

The invention relates to programming tools and in particular to an error/exception helper that provides tailored assistance when an error or exception occurs in program execution.

BACKGROUND OF THE INVENTION

A programming error that leads to the abnormal termination of a program is called an error. When an error occurs, an exception may be generated (or "raised"). For example, an exception may be generated by an arithmetic logic unit or floating-point unit of a processor when an operation such as dividing by zero is detected or when an overflow or underflow condition occurs. An exception may also be generated by trying to execute an undefined instruction, or by privilege violations.

Today, when an application being debugged generates an exception, typically, a dialog box provides a message such as:
Warning! An unhandled exception of type "System.NullReferenceException" occurred in Application 24.exe.
Additional information: Object reference not set to an instance of an object.
OPTIONS: Break Continue Ignore Help This type of dialog fails the developer because the dialog is presented out-of-context from the code that generated the exception, making it difficult for the developer to fully understand what went wrong. Also, the choices presented by the dialog are confusing. It is not clear what distinguishes "Continue" from "Ignore". The "Continue" option can be confusing because when this option is selected, the application may actually shut down. Typically, selecting the "Help" option launches a topic on using the dialog rather than a topic on how to handle the exception. Finally, the content of the dialog itself is parsimonious, confusing and does little to help the developer solve the problem in her code.

It would be helpful if a programming tool that addresses the above shortcomings were available.

SUMMARY OF THE INVENTION

An error/exception helper may provide tailored help when an error such as an exception is generated when an application is run. A break may be generated and a source program editor interface may be displayed and/or focus given to the program editor interface. An error/exception bubble or tool tip may be displayed, which, in one embodiment of the invention, points to the line of code that generated the exception. The error/exception bubble may include a link to a help topic or the actual help text may be displayed within the bubble. The bubble may also include one or more actions that may be taken to correct the error or to provide debugging help. The bubble may also include a link to a procedure to perform the action(s). The source code may be edited and execution re-initiated at which time the bubble and editor interface display may be dismissed.

BRIEF DESCRIPTION OF THE DRAWINGS

The foregoing summary, as well as the following detailed description of illustrative embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 1 is a block diagram showing an exemplary computing environment in which aspects of the invention may be implemented;

FIG. 2 is an exemplary screen shot illustrating an error/exception helper user interface in accordance with one embodiment of the invention;

DETAILED DESCRIPTION OF ILLUSTRATIVE EMBODIMENTS

Overview

Figure 3:
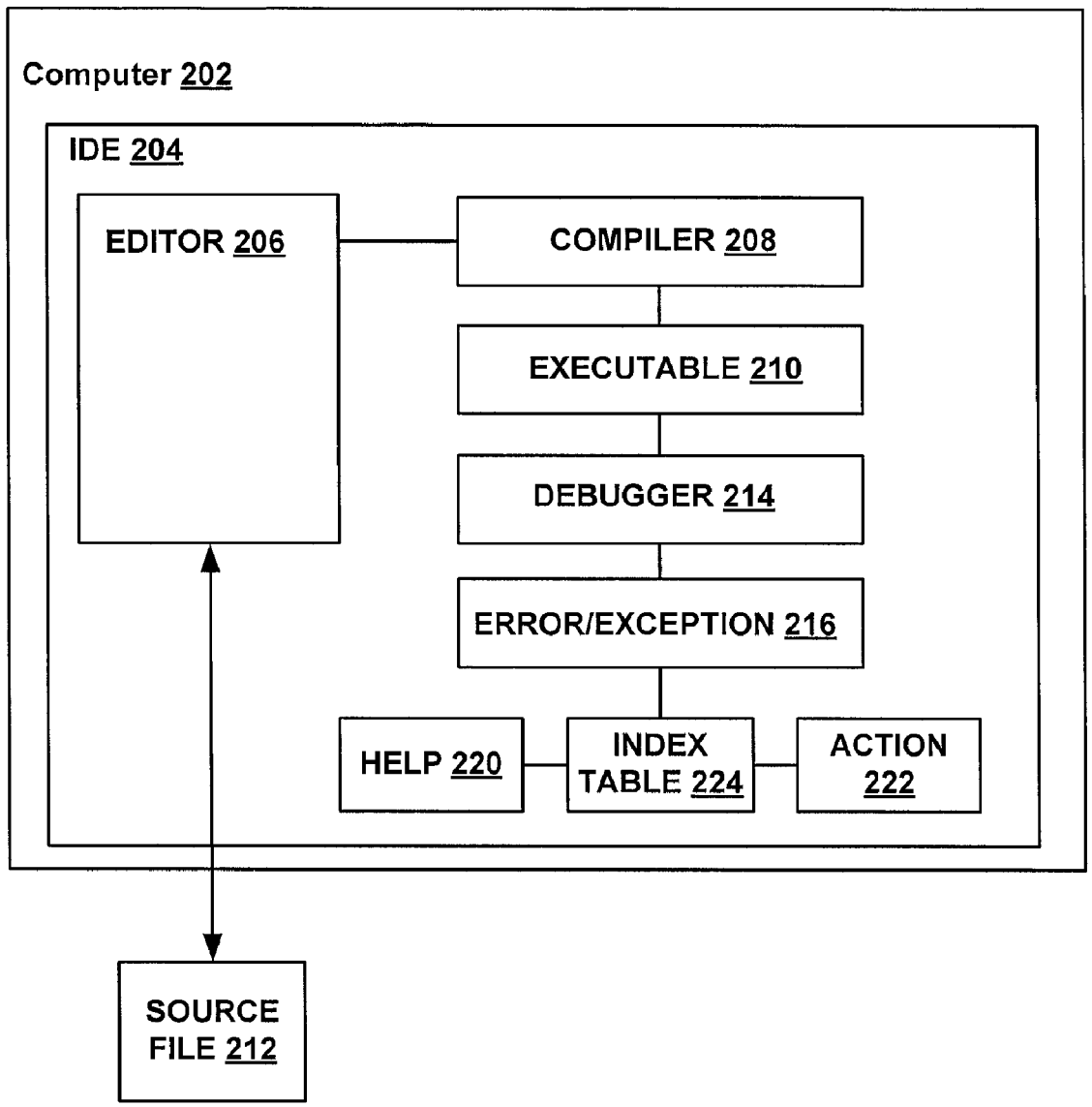
FIG. 3 is an exemplary block diagram of a system for providing error/exception help in accordance with one embodiment of the invention.

An error/exception helper may provide tailored help when an error such as an exception is generated when an application is run. A break may be generated and a source program editor interface may be displayed and/or focus given to the program editor interface. An error/exception bubble or tool tip may be displayed, which, in one embodiment of the invention, overlays the program editor interface and points to the line of code that generated the exception. If the error was generated in system code, the error/exception bubble may point to the last line of user-code that was executed before the system error was encountered. The error/exception bubble may include a link to a help topic or the actual help text may be displayed within the bubble. The bubble may also include one or more actions that may be taken to correct the error or a link to a procedure to perform the action(s). The source code may be edited and execution re-initiated at which time the bubble and editor interface display may be dismissed.

For example, suppose a developer or other user is running an application and an exception is generated. A break may be generated and a user interface such as the one illustrated in FIG. 2 may be displayed. A program editor (e.g., program editor 204) may be opened or if already open, may acquire focus. The program editor interface may display the source code (e.g., source code 240) containing the error or line of code that generated the error/exception and an error/exception bubble or tool tip such as bubble 250 may be displayed, overlaying the source code. Bubble 250 may point to the line of code 242 that generated the exception and may include information such as the type of exception generated 250a, troubleshooting tips 250b and possible actions that may be taken to correct the error 250c. In one embodiment of the invention the type of exception generated 250a may be a link to a relevant help topic in a help file. Alternatively the entire help topic may be displayed in the bubble. The link 250a or help information may be accompanied by particular information associated with the exception 250d.

If the user clicks on a help link such as link 250a in the bubble 250, an associated help topic may be launched. Alternatively, a user may select or click on an action link, launching an action to be performed. For example, suppose a database query string is improperly formatted (e.g., missing commas). Upon execution, database-access code will raise an exception. An exemplary action in one embodiment of the invention may display a database query editor which may help the user recognize the syntax error of the missing comma. The developer thus may more easily correct the code that generates the query string. Upon dismissal of the help topic or completion of the action, bubble 250 may remain visible. The source code 240 may be edited within program editor 206 and the program or application may be executed. The program editor 204 may be automatically closed (or may lose focus) and the bubble 250 may be dismissed when the application is executed. The bubble 250 may be explicitly dismissed by clicking on an exit indicator such as [X] 260. Bubble 250 may be re-opened after dismissal via a bubble icon that hovers over the program editor display. Clicking on or selecting the bubble icon may re-open the error/exception bubble display interface.

Exemplary Computing Environment

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1a illustrates operating system 134, application programs 135, other program modules 136, and program data 137.

The computer 110 may also include other removable/non-removable, volatile/nonvolatile computer storage media. By way of example only, FIG. 1a illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/ nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1a. The logical connections depicted in FIG. 1a include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1a illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

System and Method for Providing Tailored Error/Exception Help

FIG. 3 is a block diagram of a system for providing tailored error/exception help in accordance with one embodiment of the invention. In FIG. 3 computer 202 represents a computer such as but not limited to a user or development computer on which the invention may reside. The invention may be implemented as a component of an integrated design environment or as a stand-alone system. The tool may include an error/exception helper 216, and one or more of the following: one or more help files 220, one or more action files 222 and one or more index tables 224, one or more language debuggers, here represented by debugger 214, one or more language services (not shown), one or more editors represented by editor 206 for drafting and editing source code 212 and one or more compilers, represented by compiler 208. Those of ordinary skill in the art will appreciate that the design environment IDE 204 may also include other components, not shown in FIG. 3.

Source code file 212 typically is a set of instructions that a programmer or developer types or edits, and is written in a given programming language or combination of programming languages. Source code 212 typically comprises one or more statements, each statement typically comprising one or more expressions and/or entities. The expression and/or entities in the statement can be made up of multiple components. Source code 212 may be created or modified by editor 206 and may be persisted onto a stable storage medium.

Applications may be created from source code 212 using the design environment (e.g., exemplary integrated design environment (IDE) 204). The design environment may include one or more compilers, here represented by compiler 208, one or more language services (not shown), one or more design tools (represented herein by debugger 214, one or more editors, here represented by editor 206, browsers (not shown), and the like. IDE 204 may represent, for example, MICROSOFT VISUAL STUDIO .NET, or DREAMWEAVER by MACROMEDIA or BORLAND C++

BUILDER STUDIO 6 or any other software development/design tool, compiler or environment.

A design environment such as IDE 204 may generate from source code 212 executable code capable of being run in a stand-alone execution environment (not shown) or may generate an intermediate form of code that is interpreted or compiled again and run by an execution environment. Such an execution environment may include elements required in order to run the compilation produced by the design environment IDE 204 from the source code 212. The execution environment may include elements that produce native code from a non-device-specific intermediate language code. The development and execution environments may in addition include various class libraries (not shown). A suitable execution environment may, for example, represent MICROSOFT COMMON LANGUAGE RUNTIME .NET or JAVA or any other suitable execution environment. The application executable may be loaded, along with shared class libraries and the execution environment onto one or more computers (not shown) and run.

Editor 206 facilitates the development of source code 212 of a computer program. Editor 206 may be a BASIC, COBOL, FORTRAN, C, C++, a C#, JAVA, J#, VISUAL BASIC, REAL BASIC, DELPHI, ASP, PASCAL, HTML, XML, ADA, PERL, DYLAN, PYTHON, SMALLTALK, TCL-TK, EIFFEL editor, or the like.

Compiler 208 may represent a BASIC, COBOL, FORTRAN, C, C++, C#, JAVA, J#, VISUAL BASIC, REAL BASIC, DELPHI, ASP, PASCAL, HTML, XML, ADA, PERL, DYLAN, PYTHON, SMALLTALK, TCL-TK, EIFFEL compiler or interpreter or any other suitable compiler or interpreter.

In one embodiment of the invention, if an error or exception is generated when running executable 210 in debug mode, debugger 214 may send a notification to error/exception helper 216 that an error or exception has occurred. Debugger 214 may also send an indication of whether user code or non-user code has generated the exception and whether the user code that generated the exception includes code to handle the exception. In one embodiment of the invention, user code is distinguished from non-user code by the presence of debug information.

In one embodiment, if user code has generated the exception and no code is included in the user code or in the underlying operating system to handle the exception, (referred to herein as an unhandled exception), a break is generated (i.e., the application stops executing) on the last line of user-code that generated the exception and the error/exception help bubble (e.g., bubble 250 of FIG. 2) is displayed, pointing to the lastline of user-code that generated the exception. If the exception was generated in system code called by the user-code, the error/exception help bubble may likewise point to the last line of user-code executed before the system error was encountered, (i.e., the bubble may point to the line of code that called the system code that generated the exception). If the user clicks on a link in the helper bubble, (e.g., bubble 250), a help topic associated with the type of exception generated may be displayed. If the user returns to the source code editor interface, (e.g., source code editor 204), after dismissing the help topic, the helper bubble may remain visible. The user may edit the code in break mode and/or initiate an action and re-initiate execution. In one embodiment of the invention, when execution is initiated, the source code editor interface and the bubble are dismissed. The bubble may be explicitly dismissed by clicking on an exit indicator (e.g., [X] 260) and may be reopened by clicking on an exception helper icon that hovers over the editor interface display.

A user-unhandled exception occurs when a block of user code generates an exception that will be handled either in operating system code or in a user code block that occurs further along. For example, an application may have a global exception handler that logs errors (an operating system feature). When a user-unhandled exception occurs, the user may wish to handle the exception in the block that generated the exception or may wish to have the global exception handler handle it. In one embodiment of the invention, to accommodate either option, when a user-unhandled exception occurs, a break is generated (i.e., the application stops executing) on the line of code that generated the exception and a user interface is displayed with options to "break" or "continue". If the "break" option is selected, a call stack, a data structure used to keep track of the sequence of instructions executed is unwound (i.e., items are popped off the call stack) to the last line of user code that was called before the exception was generated and a break is initiated. At this point the procedure for editing the source code and displaying a help bubble as described above for unhandled exceptions may be enabled.

Alternatively, in one embodiment, if the "continue" option is selected, execution continues and the exception is handled by the operating system code and/or the application aborts. If the user begins to edit the source code without selecting the break option, a break automatically occurs, allowing the editing of the source code.

Finally, if a handled exception is encountered, an icon representing the error/exception helper appears, enabling the user to select the icon and resulting in initiation of a break in execution and the appearance of the error/exception bubble. An icon as described above may also be displayed if a user stops program execution by setting a breakpoint inside a section of error-handling user-code.

When the error/exception helper is initiated, the debugger, in one embodiment of the invention, sends the error/exception helper information such as information concerning the type of exception, the name of the application programming interface that the user called, and state information. State information may include information such as but not limited to a connection string, a particular file path. The error/exception helper may use information provided by the debugger to access a table index or look up table of error/exception help information 222 to locate and display information or a link to information concerning the exception. The information accessible via information stored in the look up table 224 may include generic help, particular help and/or troubleshooting tips and actions that may be taken to correct or diagnose the problem. The error/exception helper may also or alternatively display particular information concerning the exception derived from the state information from the executing application. Information displayed may also include information concerning actions that may be taken to correct the error that resulted in the generation of the exception. Help concerning the exception type may be launched from within the error/exception bubble. Actions may involve interactions with the design and/or execution environment.

Figure 4:
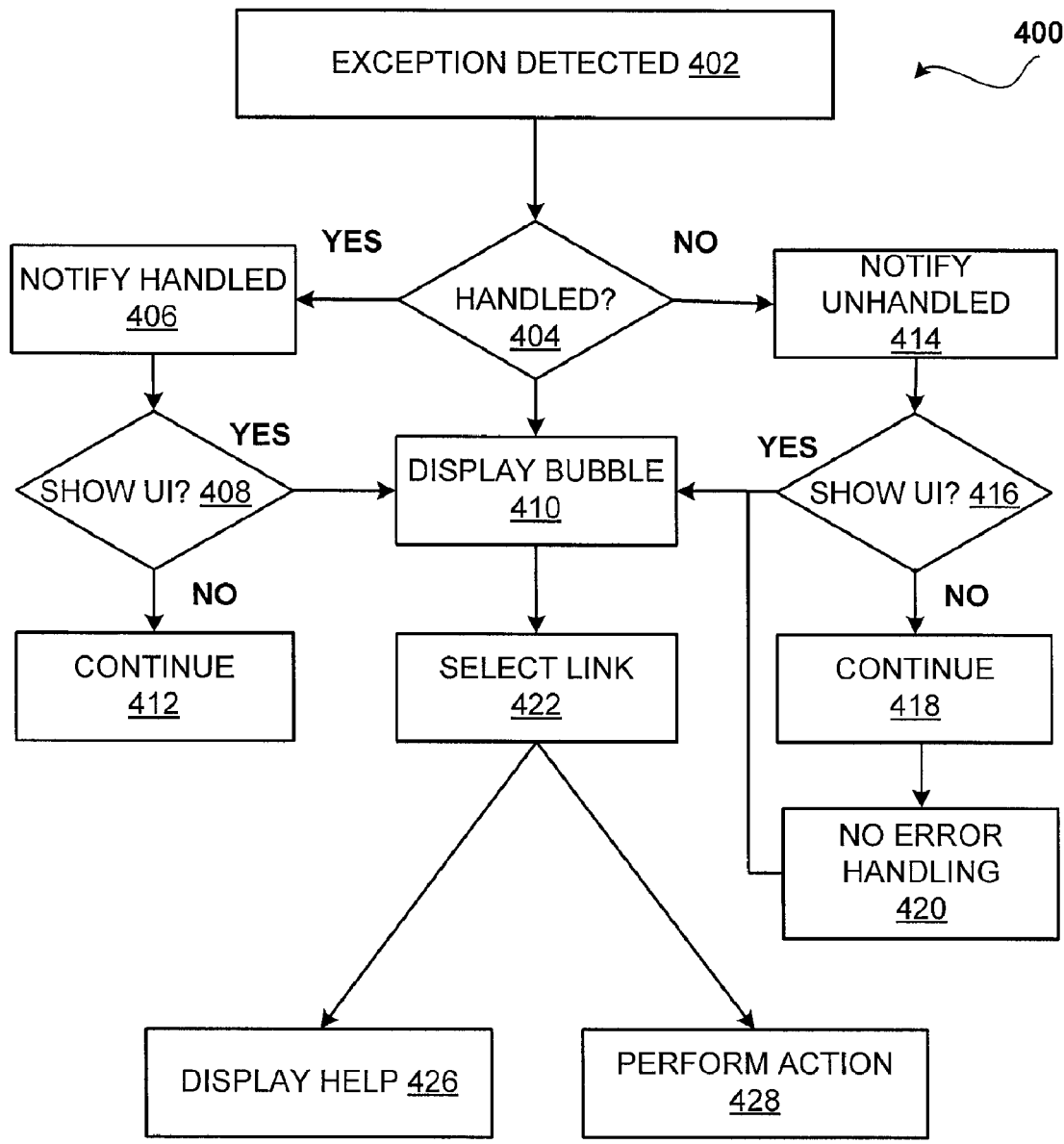
FIG. 4 is a flow diagram of an exemplary method to provide tailored help in accordance with one embodiment of the invention.

FIG. 4 is a flow diagram of a method of providing tailored help in a design environment in accordance with one embodiment of the invention. Referring now to FIG. 4, in step 402 an error or exception is detected. At step 404, the type of exception (handled or unhandled) is determined. If the exception is a handled exception, a notification is sent that a handled exception has been generated. Additional information sent in addition to the notification that a handled exception has been generated may be information concerning the type of exception (e.g., a security exception, a null reference exception, a SQL exception, an invalid cast exception and the like), the error message, the name of the application programming interface that the user called, and state information. State information may include information such as but not limited to a connection string, or particular file path. At step 408, a user-determined option is consulted to determine if a user interface is to be displayed. If the user interface is to be displayed, execution is halted and the error/exception bubble is displayed at step 410. If the user interface is not to be displayed, execution continues at step 412.

If, at step 404, the exception is determined to be an unhandled exception, a notification that an unhandled exception has been received is sent at step 414. Additional information sent in addition to the notification that a unhandled exception has been generated may be information concerning the type of exception, the name of the application programming interface that the user called, and state information. State information may include information such as but not limited to a connection string, or particular file path. At step 416 a user-determined option is consulted to determine if a user interface is to be displayed. If a user interface is to be displayed, processing continues at step 410 and the error/exception bubble is displayed. If the user interface is not to be displayed, execution continues at step 418. At step 420, the absence of error handling is detected and the error/exception bubble is displayed in step 410.

When the error/exception bubble is displayed, information (such as state information) received may be used to access a lookup table and display help and action information and links within the bubble. Selecting one of this links at step 422 may launch a help information display at step 426 or may initiate an action at step 428. Processing can continue until the feature is exited at step 430.

For example, suppose a line of code in an application includes an arithmetic operation, divide by zero. Suppose the application is executed in debug mode. When the divide by zero operation is encountered, an exception is generated (step 402). Suppose there is no error trapping logic in the application for catching a divide by zero operation. In this case, an "unhandled" notification may be sent to the error/exception helper at step 414. At step 416, a user-determined option is consulted to determine if a user interface is to be generated at step 416. If an interface is to be generated, the error/exception bubble is displayed at step 410.

Now suppose that a developer wrote the following line of code:

Dim frm As Form instead of:

Dim frm As New Form

Figure 5A:
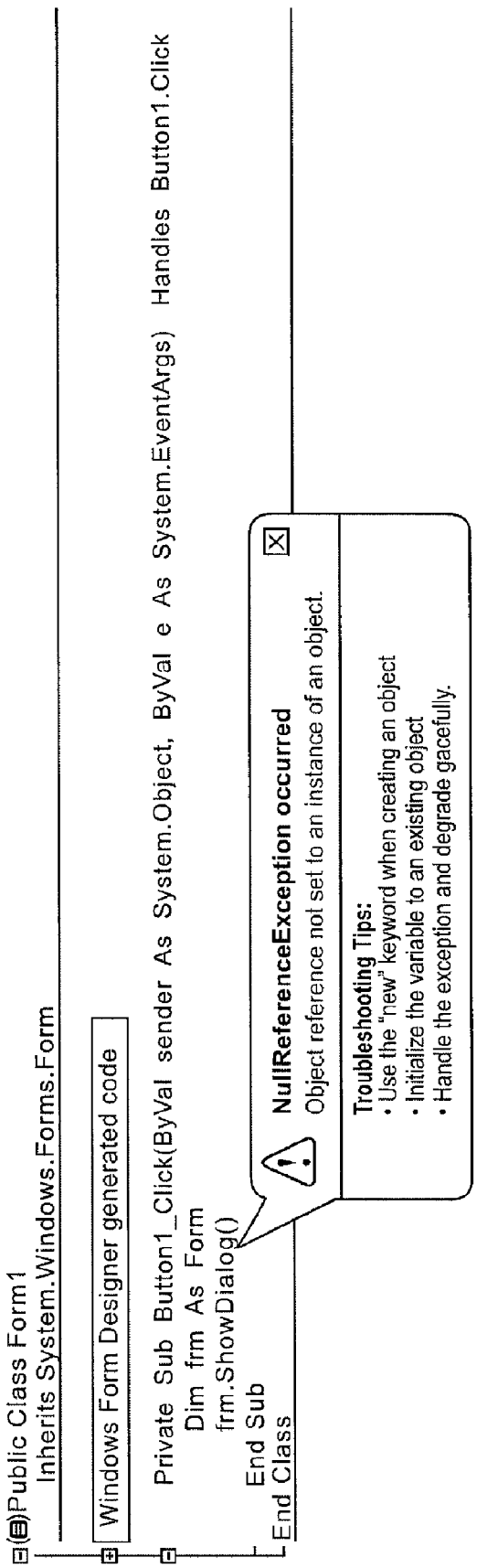
FIGS. 5a-c are illustrative error/exception helper interfaces in accordance with embodiments of the invention.

In one embodiment of the invention, the user interface of FIG. 5a would be displayed.

Now suppose a developer wrote the following line of code:

Dim conn As New SqlClient.SqlConnection ("Initial Catalog=Northwind; Data Source=XXXXXXXX; Packet Size=4096; Workstation ID=ERICKN1; Integrated Security=SSPI; Persist Security Info=False")

instead of using a valid server name, such as:

Dim conn As New SqlClient.SqlConnection ("Initial Catalog=Northwind; Data Source=erickn1; Packet Size=4096; Workstation ID=ERICKN1; Integrated Security=SSPI; Persist Security Info=False")

Figure 5B:
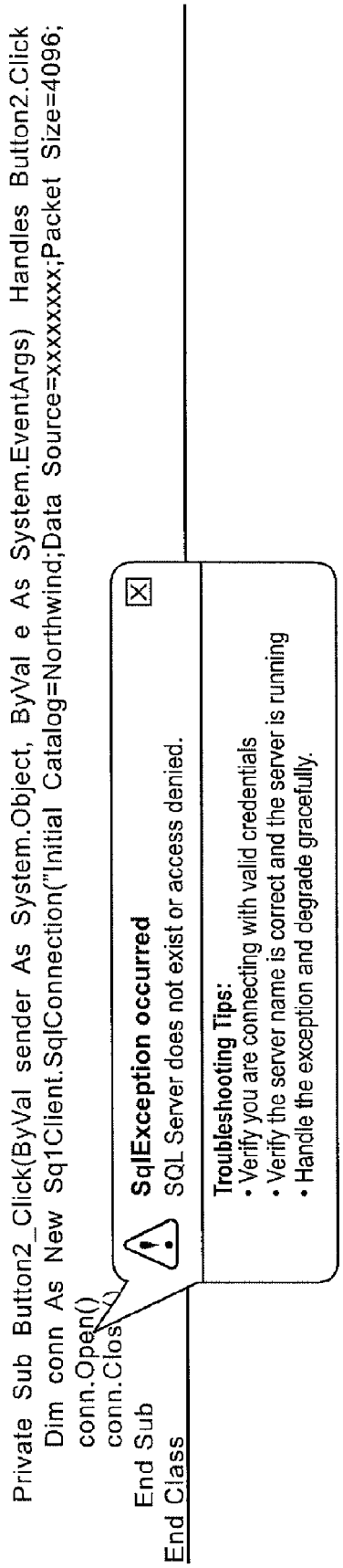

In one embodiment of the invention, the user interface of FIG. 5b would be displayed.

Finally. Suppose a developer write the following line of code:

Dim obj As Object=New DataSet
Dim frm As Form
frm=CType (obj, Form)

instead of:

Dim obj As Object=New DataSet
Dim frm As DataSet
frm=CType (obj, DataSet)

Figure 5C:
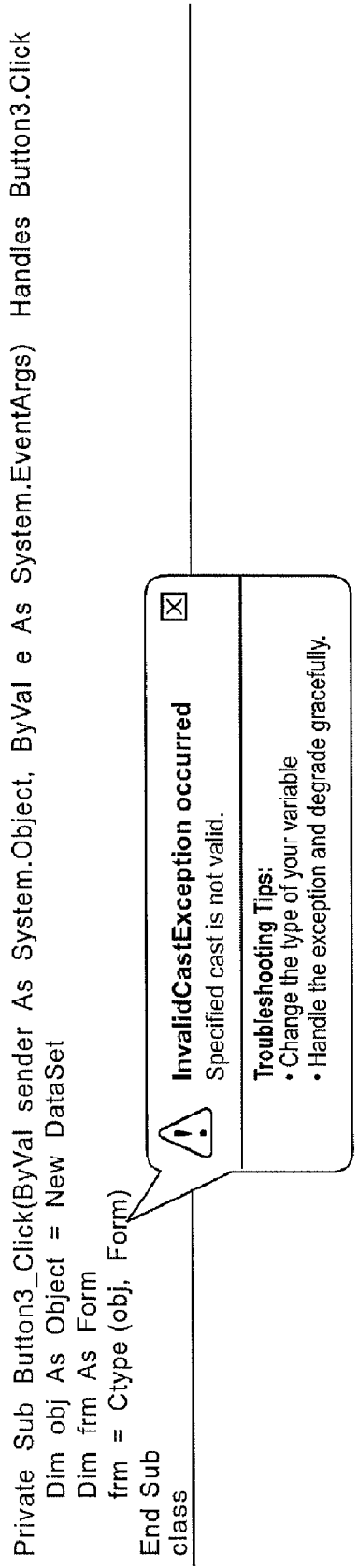

In one embodiment of the invention, the user interface of FIG. 5c would be displayed.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed is:

1. A computer implemented method of providing tailored help when an execution error is encountered, the method comprising:

in response to detection of an execution error in an instruction in a program during execution of the program, receiving, via a computer, a notification that the execution error has been detected, the notification comprising execution-specific information comprising a type of execution error, an error message associated with the execution error and a line of code associated with the execution error;

initiating a source code editor and a help bubble, the help bubble displaying a message overlaying a source code editor interface displaying source code associated with the execution error, the message comprising information associated with the execution error and a software tool to rewrite the instruction in the program comprising the detected execution error;

in response to a determination that the software tool has been selected, correcting the execution error by editing the source code associated with the execution error without any action by a user; and in response to a determination that execution has been reinitiated, dismissing the source code editor and help bubble.

2. The method of claim 1, wherein the message points to a line in the source code, the line in the source code associated with the line of code received in the notification, the line in the source code comprising an error, the error responsible for generation of the execution error.

3. The method of claim 1, wherein the type of execution error comprises a handled execution error.

4. The method of claim 3, wherein the handled execution error comprises an error handled in user code.

5. The method of claim 3, wherein the handled execution error comprises an error handled by operating system code.

6. The method of claim 1, wherein the type of execution error comprises an unhandled execution error.

7. The method of claim 1, wherein the type of execution error comprises a security exception.

8. The method of claim 1, wherein the type of execution error comprises an invalid arithmetic operation exception.

9. The method of claim 1, wherein the message can be dismissed by selecting an exit indicator.

10. The method of claim 1, wherein the message can be re-initiated by selecting an exception helper indicator.

11. The method of claim 1, wherein a user interface is generated in response to a user-specified setting.

12. The method of claim 1, wherein the message further comprises tips for correcting an error in the line of source code.

13. The method of claim 1, wherein the message further comprises a link to a help topic associated with the type of exception received in the notification.

14. The method of claim 1, further comprising editing the source code.

15. The method of claim 1, further comprising re-initiating execution.

16. A system for providing tailored help when an execution error is encountered during execution of a process, the system comprising:

a processor executing an error helper receiving a notification that an execution error has occurred, the notification also comprising execution-specific information comprising state information, error type and indicating a line of source code where the execution error occurs, wherein the error helper automatically opens a source code editor and a help bubble, the help bubble displaying a message overlaying the source code editor displaying source code associated with the execution error and the message comprising information associated with the execution error, the source code editor displaying the line of source code and wherein the execution-specific information is used to find a set of help topics available via links displayed adjacent to the line of source code;

the processor further executing a software tool associated with the help bubble, and in response to a determination that the software tool has been selected, correcting the execution error by editing the source code associated with the execution error without any action by a user, and wherein the error helper, in response to a determination that execution of the program has been re-initiated, dismisses the source code editor and help bubble.

17. The system of claim 16 further comprising a debugger for detecting the error and initiating a break in the execution.

18. The system of claim 17, wherein the debugger sends the notification of the error, the state information, the error type and the line of source code where the error occurs.

19. The system of claim 17, wherein the debugger resumes execution of the process after the source code is edited.

20. A computer-readable storage medium comprising computer-executable instructions for performing the following:

in response to detection of an execution error in an instruction in a program, receiving, during execution of the program, a notification that the execution error has been detected, the notification comprising execution-specific information comprising a type of execution error, an error message associated with the execution error and a line of code associated with the execution error;

initiating a source code editor and a help bubble, the help bubble displaying a message overlaying a source code editor interface displaying source code associated with the execution error, the message comprising information associated with the execution error and a software tool to rewrite the instruction in the program comprising the detected execution error, wherein the execution-specific information is used to find a set of help topics available via links displayed adjacent to the displayed source code;

in response to a determination that the software tool has been selected, correcting the execution error by editing the source code associated with the execution error without any action by a user; and in response to a determination that execution has been re-initiated, dismissing the source code editor and bubble.

21. A method, executable by software instructions stored in a computer, of providing tailored help when an execution error is encountered, the method comprising:

in response to detection of an execution error in an instruction in a program during execution of the program, receiving a notification that the execution error has been detected, the notification comprising execution-specific information comprising a type of execution error, an error message associated with the execution error, and a line of code associated with the execution error;

initiating a source code editor and a help bubble, the help bubble displaying a message overlaying a source code editor interface displaying source code associated with the execution error, the message comprising information associated with the execution error and a software tool to rewrite the instruction in the program comprising the detected execution error;

in response to a determination that the software tool has been selected, correcting the execution error by editing the source code associated with the execution error without any action by a user;

in response to the determination that the software tool has been selected, dismissing the source code editor and bubble without any further action by the user; and in response to a user clicking on or selecting a bubble icon, the help bubble is reopened.

* * * * *